Jan. 28, 1930.	J. W. JOHNSTON	1,745,301
BRAKE DRUM
Filed Nov. 10, 1926
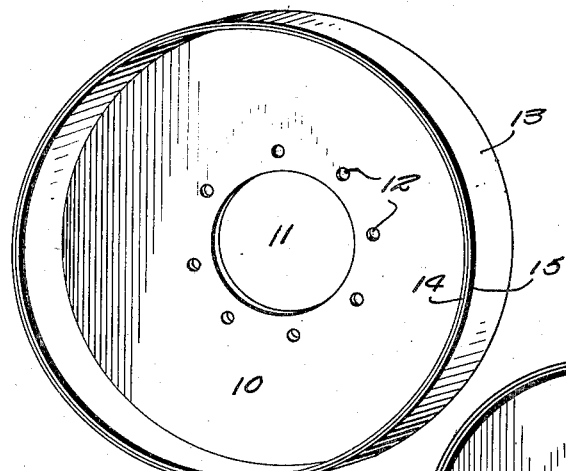
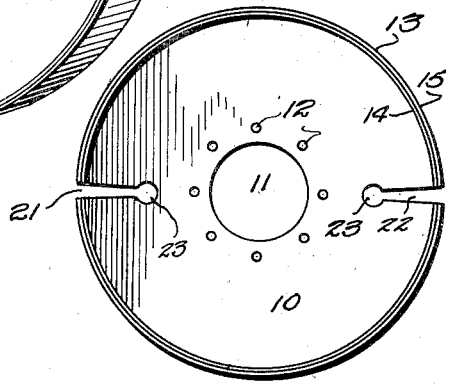
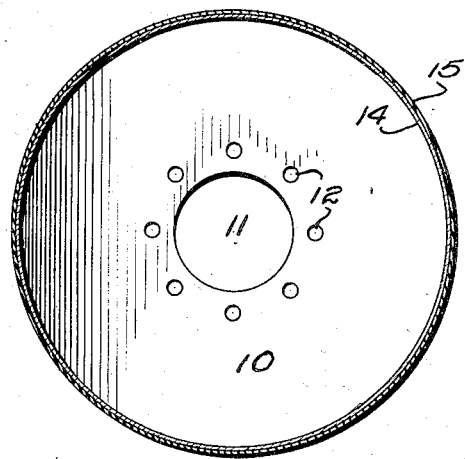
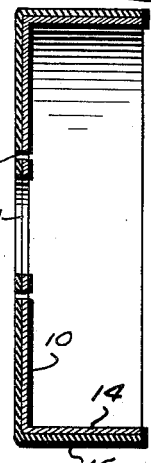
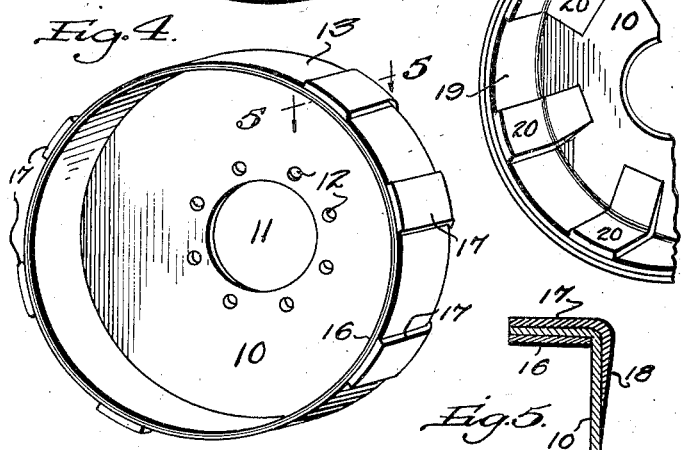
Inventor
J. W. JOHNSTON
Attorney Patented Jan. 28, 1930

1,745,301

UNITED STATES PATENT OFFICE

JOSEPH W. JOHNSTON, OF STEUBENVILLE, OHIO

BRAKE DRUM

Application filed November 10, 1926. Serial No. 147,552.

This invention relates to brake drums and more particularly to automobile brake drums.

The principal object of this invention is to provide a brake drum which will reduce or eliminate the squeak common to the brake drums heretofore constructed.

An important object of my invention is to construct a brake drum from laminated metal, the laminations either being of the same or of different metals.

A further object of this invention is to provide a brake drum with means for dampening the tone vibrations in the drum.

Other objects and advantages of the invention will be apparent during the course of the following description.

In the accompanying drawings I have shown several embodiments of my invention. In this showing, Figure 1 is a perspective view, Figure 2 is a vertical longitudinal section, Figure 3 is a transverse vertical section, Figure 4 is a perspective view of a modified construction, Figure 5 is a detail sectional view on line 5—5 of Figure 4, Figure 6 is a fragmentary view of another modified construction, and Figure 7 is a face view of a further modification.

With reference to the accompanying drawings the numeral 10 indicates the customary disk portion of an automobile brake drum provided with a hub opening 11 and hub bolt openings 12. Preferably formed integrally with the disk portion 10 is the customary flange or brake band engaging portion 13. The disk portion 10 and the flange portion 13 are preferably formed of laminated sheet metal. In the accompanying drawings as clearly shown in Figure 3, the drum is shown as being formed of two layers of metal 14 and 15. It is obvious that the drum can be constructed of more than two layers of metal if desired. Various methods of forming the drum can be resorted to. For example, the drum can be stamped from a sheet of laminated metal, or the inner portion 14 and the outer portion 15 can be made independently and secured together in any suitable manner. Furthermore the inner portion 14 of the drum can be constructed from a different metal than the outer portion 15 of the drum or the inner and outer portion of the drum may be constructed from the same metal. If it is desirable, when the inner and outer portions of the drum are formed from the same metal, the different portions may be subjected to different treating processes; for example, they may be subjected to different heat treating processes.

By constructing a brake drum from a plurality of layers of metal the squeak commonly encountered with the ordinary brake drum is materially reduced or eliminated. I have discovered that the squeak of the brake drum is the result of tone vibrations set up in the drum when the brake lining is applied to the drum. By constructing a drum in the manner described above the drum will be made up of portions having different periods of vibration. If the various portions are made from the same metal the difference in the vibration period will be due to the difference in size of the various portions. If the portions are made from different materials or from the same materials which have been treated according to different treating processes a difference in tone vibration of the different portions will result. Hence it will be seen that when the drum is set in vibration by reason of the application of a brake band the vibration of one portion of the drum will be counteracted by the vibration of another portion of the drum with the result that the squeak will be materially reduced or substantially eliminated.

In addition to the above described construction, I have discovered that various modifications of this device will produce the desired result. For example, in Figure 4 of the drawings, I have shown a modification in which a band 16 is secured within the brake band engaging portion and pieces 17 of the same or different metal are secured to the outer portion of the brake band engaging portion 13. The members 17 are provided with tapering flange portions 18 which are secured to the disk portion 10 of the drum.

This modification is particularly adapted for use with internal brake bands.

In Figure 6, I have shown a modification which is particularly adapted for use with externally applied brake bands. This construction is particularly suitable for use in four-wheel brakes where it is common practice to employ externally applied brake bands. In this modification the brake band engaging portion 13 is provided with an inner ring 19. Secured to the ring 19 and the disk portion 10 are pieces of dampening material 20. These are secured in spaced relation around the inner surface of the drum. In this modification as well as in the modification shown in Figure 4 the spaced pieces of dampening material may be secured in any desired manner, as by spot welding.

In Figure 7, I have shown an additional modification in which the drum is constructed of laminated metal and the flange portion 13 is provided with transverse openings or slots 21 and the disk portion 10 is provided with slots or openings 22 having enlarged portions as at 23. In addition to the dampening effect produced by the laminated material the slots 21 and 22 further assist in destroying tone vibrations in the drum.

While I have described the members 17 and 20 as being made of metal it is obvious that they may be constructed of any suitable dampening material such as felt, belting and the like.

It is to be understood that the forms of my invention herewith shown and described are to be taken as preferred examples of the same, and that various changes in the shape, size and arrangement of parts may be resorted to without departing from the spirit of the invention or the scope of the subjoined claims.

I claim:

1. A brake drum comprising a disk portion and a brake band engaging portion, each of said portions being formed of a plurality of pieces of metals having different periods of vibration.

2. A brake drum comprising a disk portion and a brake band engaging portion, each of said portions being formed of metal laminations of substantially equal thickness.

3. A brake drum comprising a disk portion and a brake band engaging portion, each of said portions being formed of laminations of substantially equal thickness formed of different metals.

4. A brake drum formed of laminated metal and including a brake band engaging portion, and means for dampening the tone vibration of said drum.

5. A brake drum formed of a plurality of superimposed sheets of metal of substantially equal thickness, said drum including a disk portion and a brake band engaging flange.

6. A brake drum comprising a pair of superimposed plates of sheet metal of substantially equal thickness and formed to include a disk portion and a brake band engaging portion.

7. A brake drum formed of superimposed laminations of sheet metal of substantially equal thickness and including a brake band engaging flange, and a plurality of members secured to said flange for dampening the tone vibrations of said drum.

In testimony whereof I affix my signature.

JOSEPH W. JOHNSTON.